C. HOOFSTATTER.

Domestic Oven.

No. 20,389.

2 Sheets—Sheet 1.

Patented May 25, 1858.

C. HOOFSTATTER.

Domestic Oven.

No. 20,389.

2 Sheets—Sheet 2.

Patented May 25, 1858.

UNITED STATES PATENT OFFICE.

CHARLES HOOFFSTATTER, OF ROME, NEW YORK, ASSIGNOR TO JOSEPH FIRMAN, OF SAME PLACE.

STOVE.

Specification of Letters Patent No. 20,389, dated May 25, 1858.

*To all whom it may concern:*

Be it known that I, CHARLES HOOFFSTATTER, of Rome, in the county of Oneida and State of New York, have invented a new and Improved Mode of Constructing Parlor Cook-Stoves, of which the following is a full, clear, and exact description, reference being had to the accompanying drawings, making part of this specification, in which—

Figure 1:
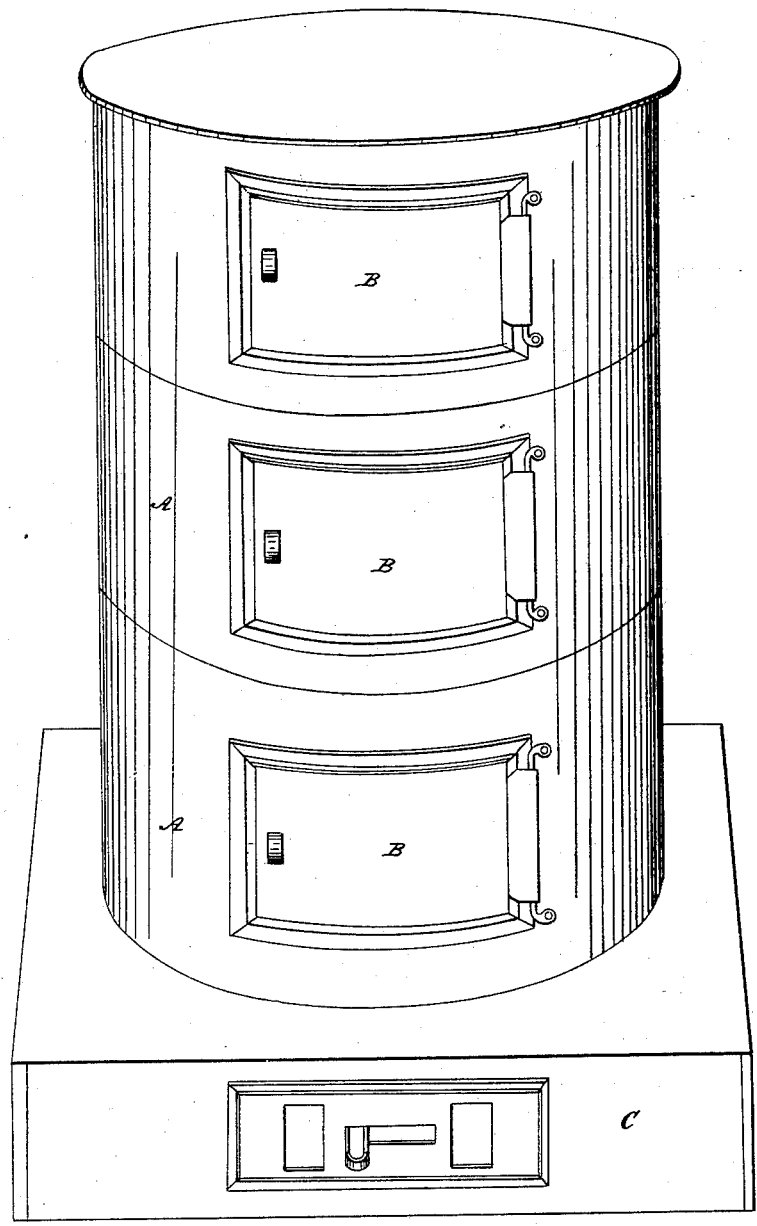
Figure 2:
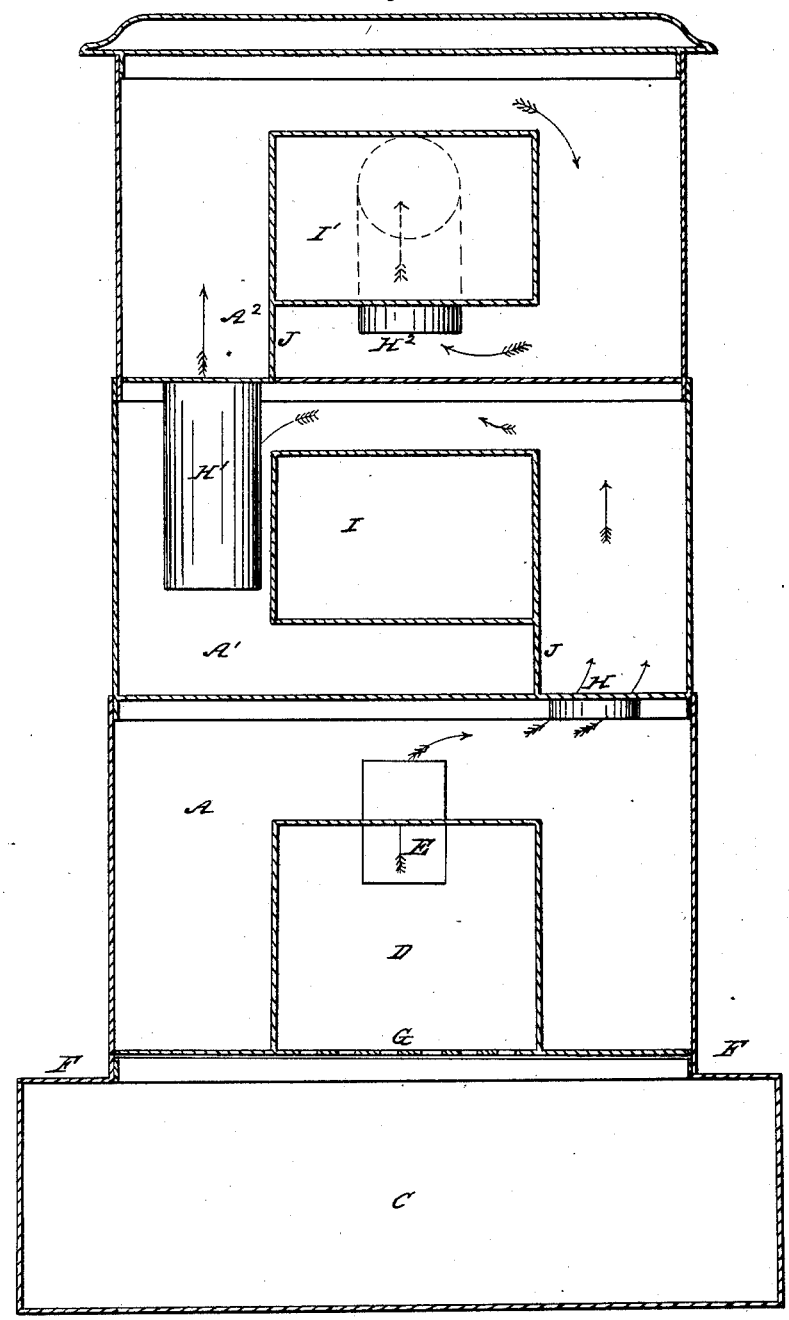

Figure 1, represents a view in perspective of a stove constructed on my improved plan. Fig. 2 a vertical section of the same.

Heretofore great objections have been raised to that class of parlor stoves which have cooking and baking arrangements applied to them, because that in their use, when it is desired to bring the oven to the high degree of temperature requisite for baking, it is necessary to consume much more fuel for that purpose than is required for the mere purpose of heating the apartment, which thereby becomes greatly overheated and consequently unfitted for use during the time the stove is used for cooking purposes, and further because that the amount of fuel so consumed is much greater than is required by the common cooking stoves which are so constructed as to expose the articles to be cooked to the direct action of the fire.

The object of my improvement is mainly to construct a cheap and economical stove available alike for parlor or cooking purposes and which will not consume in either case an amount of fuel greater than is necessarily required for the purpose of heating the room. And it consists in so arranging and constructing the stove as to bring the heat to bear mainly on the ovens by causing it to pass around over and under them, previous to its reaching the upper compartment, or escaping up the chimney. By this plan the ovens can be heated in a very short time, and that with a consumption of fuel much less than is generally required for heating purposes alone in most of the stoves now in general use.

To enable others skilled in the art to make construct and use my improvement I will now proceed to describe it in detail.

The external construction of my improved stove is similar to those in general use, and merely differs from them in its internal arrangement; it being divided into three compartments (A, $A^1$ and $A^2$) into the upper two of which are arranged the ovens (I and I′) supported on or otherwise secured to the inside of the stove in any suitable manner consistent with the peculiar arrangement of flues which I use for the better diffusion of the heat around the ovens. In the lowest compartment (A) is arranged the fire chamber (D) in the bottom of which is secured the grate (G) through which the ashes fall into the ash pit (C) below. In the top of the fire chamber (D) an aperture or flue (E) is formed, which conducts the heat &c. into the lower compartment (A) whence it is led into the middle one (A′) through another pipe or flue (H). This compartment is so constructed or divided off by a partition (J) and which is so arranged as to assist in supporting the oven (I), as to cause the heat &c to pass up along the back of the oven over its top and down along its other end and sides and under its bottom, and thence out and into the upper compartment ($A^2$) through the flue pipe (H′), whence it performs exactly the same circuit around the upper oven (I′) inasmuch as the construction of this compartment is the same as that of the middle one just described. In order to compel or cause the heat to travel around the oven in this way the flue pipe (H′) instead of opening directly at the top of the middle chamber (A′) into the upper ($A^2$) is led down nearly to the bottom of the middle chamber, which draws the heat downward previous to its passage to the next chamber—thus giving to the oven a better opportunity of absorbing the heat by retarding its progress toward the chimney, the heat &c having been led into the upper compartment ($A^2$) (the arrangement of which is similar to that of the middle one, as on the side of its oven (I′) next to the pipe (H′) is arranged a partition (J′) similar to the other, which forces the heat to travel around the oven, over and under it) will escape, through a pipe ($H^2$), suitably arranged for this purpose at the other side of the partition (J′) at the back of the compartment and near its bottom, into the chimney.

It will be perceived that by such an arrangement the ovens will be efficiently heated, as all their sides are successively and simultaneously subjected to the action of the heat, while the consumption of fuel is very small, from the fact that the smoke and other products of the combustion of the fuel will give up the greatest amount of their heat before they reach the chimney.

Having thus described my improvement in combined parlor and cooking stoves, what I claim as new and desire to secure by Letters Patent is—

The flues (H, H' & H²) and partitions (T & T') in connection with the ovens (I & I') when the whole are arranged in relation to each other in the manner as and for the purposes set forth.

CHARLES HOOFFSTATTER.

Witnesses:
L. J. WORDEN,
JNO. P. VAN VLICK.